(12) United States Patent
Honma et al.

(10) Patent No.: US 7,060,749 B2
(45) Date of Patent: Jun. 13, 2006

(54) POLYESTER COMPOSITION, FILMS MADE THEREOF AND PROCESS FOR PRODUCING THE COMPOSITION

(75) Inventors: Yoshihiro Honma, Mishima (JP); Tsutomu Morimoto, Higashihiroshima (JP); Minoru Yoshida, Shiga (JP)

(73) Assignee: Toray Industries, Inc., Tokyo (JP)

( * ) Notice: Subject to any disclaimer, the term of this patent is extended or adjusted under 35 U.S.C. 154(b) by 135 days.

(21) Appl. No.: 10/182,556

(22) PCT Filed: Nov. 28, 2001

(86) PCT No.: PCT/JP01/10347

§ 371 (c)(1),
(2), (4) Date: Jul. 30, 2002

(87) PCT Pub. No.: WO02/44275

PCT Pub. Date: Jun. 6, 2002

(65) Prior Publication Data

US 2003/0045649 A1  Mar. 6, 2003

(30) Foreign Application Priority Data

Dec. 1, 2000 (JP) ............................. 2000-367245
May 10, 2001 (JP) ............................. 2001-139648

(51) Int. Cl.
*C08L 67/02* (2006.01)
*C08K 3/10* (2006.01)

(52) U.S. Cl. .................. 524/601; 524/366; 524/378; 525/408; 525/437

(58) Field of Classification Search ................ 525/437, 525/408; 524/378, 366
See application file for complete search history.

(56) References Cited

U.S. PATENT DOCUMENTS

| | | | | |
|---|---|---|---|---|
| 3,687,978 A | * | 8/1972 | Pedersen .................... 549/349 |
| 4,215,032 A | * | 7/1980 | Kobayashi et al. .......... 524/377 |
| 4,795,771 A | * | 1/1989 | Yoshihara ................... 524/114 |
| 5,399,605 A | * | 3/1995 | Yoshihara et al. .......... 524/377 |
| 5,431,856 A | * | 7/1995 | Okoniewski et al. ....... 252/500 |
| 5,475,480 A | * | 12/1995 | Cahill et al. ................ 399/318 |

* cited by examiner

*Primary Examiner*—Jeffrey B. Robertson
(74) *Attorney, Agent, or Firm*—Kubovcik & Kubovcik

(57) ABSTRACT

A polyester composition includes a ligand capable of coordinating to a metal or metal ion, wherein the ligand includes at least one donor atom selected from the group consisting of a nitrogen atom, a sulfur atom, and an oxygen atom. Consequently, it is possible to inactivate a metal catalyst which adversely affects heat resistance. As a result, it is possible to obtain polyester compositions and films having excellent heat resistance, colorability, and weathering resistance. Moreover, in the process of producing a polyester, by separating and recovering a catalyst by adding a ligand which is capable of coordinating to a metal or metal ion and which includes at least one donor atom selected from the group consisting of a nitrogen atom, a sulfur atom, and an oxygen atom, it is possible to improve the heat resistance of the polyester composition.

8 Claims, No Drawings

POLYESTER COMPOSITION, FILMS MADE THEREOF AND PROCESS FOR PRODUCING THE COMPOSITION

TECHNICAL FIELD

The present invention relates to polyester compositions having excellent heat resistance, colorability, and weathering resistance which are used as magnetic materials, packaging materials, optical materials, electric materials, etc., to polyester films, and to methods for producing polyester compositions.

BACKGROUND ART

Polyester films, polyethylene terephthalate films in particular, having excellent mechanical characteristics, thermal characteristics, and electrical characteristics, are widely used in various industrial fields and are in increasing demand. However, as the applications broaden and the demands increase, there is a greater need for improvements in the characteristics and productivity of polyesters. Therefore, although polyester films are produced for various purposes, such as for industrial use and for magnetic material use, there are many problems to be solved.

In general, when a polyester film is formed, a polymer produced by polymerization is melted again to form the polyester film. There is residence time in the process in which the polymer is melted again and melt extrusion is performed. The polymer deteriorates during the residence time, resulting in an increase in filter pressure due to clogging of the filter and defects in the film product, thus giving rise to problems. Pyrolysis, oxidative degradation, hydrolysis, etc., of the polymer are considered to be the reasons for the above, and it is supposed that a metal catalyst present in the system promotes the oxidative degradation and hydrolysis of the polymer.

In order to improve productivity in the film-forming process, desirably, a film is electrostatically charged and brought into close contact with a casting drum when cooling and setting are performed. In order to perform casting by the electrostatic casting method, a metal at a predetermined amount or more is desirably added to the polymer. However, although productivity is improved by the addition of the metal, heat resistance is degraded because the metal acts as a degradation catalyst, which is undesirable. It is known that, in order to improve heat resistance, preferably, the metal additive is inactivated or a portion of the metal is removed. However, with respect to a currently known method in which metal additive is inactivated using a phosphorus compound, although the metal can be inactivated, the electrostatic adhesion between the molten film and the casting drum is decreased, which is problematic.

Furthermore, Japanese Unexamined Patent Application Publication No. 2000-34343 discloses a method for recovering and removing a catalyst from ethylene glycol produced in a polycondensation step. However, no proposition has been made on recovery and removal of a metal catalyst from a polyester composition.

As described above, there are no known methods by which it is possible to remove or inactivate a metal catalyst, which adversely affects heat resistance, without decreasing electrostatic adhesion between a molten film and a casting drum.

DISCLOSURE OF INVENTION

A polyester composition or a polyester film according to the present invention includes a ligand capable of coordinating to a metal or metal ion, wherein the ligand includes at least one donor atom selected from the group consisting of a nitrogen atom, a sulfur atom, and an oxygen atom.

A method for producing a polyester composition according to the present invention includes, in the process of producing a polyester, a step of separating and recovering a catalyst by adding a ligand which is capable of coordinating to a metal or metal ion and which includes at least one donor atom selected from the group consisting of a nitrogen atom, a sulfur atom, and an oxygen atom.

BEST MODE FOR CARRYING OUT THE INVENTION

The present invention will be described below.

A polyester composition of the present invention includes a ligand capable of coordinating to a metal or metal ion, wherein the ligand includes at least one donor atom selected from the group consisting of a nitrogen atom, a sulfur atom, and an oxygen atom.

The polyester composition of the present invention may be produced by a method in which a dialkyl ester is used as an acid component, and after initiating a transesterification reaction of the dialkyl ester with a diol component, a polycondensation step is performed by heating the reaction product under reduced pressure to eliminate an excess diol component. Alternatively, the polyester composition may be produced by direct polymerization using a dicarboxylic acid as an acid component.

The ligand used in the present invention is preferably a clathrate compound. Preferred examples of the ligands used in the present invention include linear polyether amides, cyclic polyethers, linear polyethers, cyclic polyether polyesters, cyclic polyketones, cyclic polyamines, cyclic polyamine polyamides, cyclic polythiaethers, azacrown ethers, thiacrown ethers, cyclic azathiacrown ethers, azathiacrown ethers, bicyclic cryptands, tricyclic cryptands, spherical cryptands, linear polyamines, and sulfur-containing ligands such as phosphorus sulfide. Cyclodextrin is also a preferred ligand used in the present invention.

In the present invention, as the ligands, cyclic polyethers are particularly preferred because they have a simple structure and have superior coordination linkage to metal ions in terms of entropy. Suitable ligands are 18-crown-6, 15-crown-5, 12-crown-4, 30-crown-10, dibenzo-18-crown-6, and dibenzo-30-crown-10 among the cyclic polyethers; pentaglyme, hexaglyme, and decane glyme among the linear polyethers; tetraamines, hexamethylene tetraamine (hexaamine), and pentaamines among the linear polyamines; phosphorus sulfide among the sulfur compounds; and [2,1,1], [2,2,1], [2,2,2], [3,2,2], [3,3,2], and [3,3,3] cryptands as the bicyclic cryptands. Above all, 18-crown-6 is preferable because structural distortion does not occur and because six-coordination to a metal ion is enabled, and 30-crown-10 is also desirable because ten-coordination to a metal or metal ion is enabled and it surrounds the metal or metal ion almost completely, resulting in stable conformation.

In order to inactivate the function of the metal or metal ion as the catalyst, preferably, the ligand used in the present invention includes at least 4 donor atoms so that the active sites of the metal ion are blocked. If the number of donor atoms is 3 or less, the active sites of the metal, the number of active sites usually being 4 or more, may not be blocked by the coordination. If the number of donor atoms exceeds 20, the ring structure becomes large, and as a result, the conformation for receiving the metal or metal ion may be distorted, resulting in difficulty in trapping the metal or metal ion. Therefore, the number of donor atoms of the ligand is preferably 4 to 20, and more preferably, 6 to 10.

In the present invention, when an alkali metal or alkaline-earth metal is mainly coordinated, the donor atom of the ligand is preferably an oxygen atom. The reason for this is that the oxygen atom, which has the highest electronegativity among the oxygen atom, the nitrogen atom, and the sulfur atom, can hold a metal having a small ionic radius, such as an alkali metal or alkaline-earth metal, more strongly by ionic bonding (ion-dipole interaction) in addition to covalent bonding. Furthermore, the oxygen atom can coordinate to a catalyst composed of a transition metal, such as antimony or germanium, and reverse reactions, that is, pyrolysis, oxidative degradation, and hydrolysis reactions of the polymer, can be inhibited by the steric hindrance effect of the ligand. When the metal to which the ligand coordinates has a large ionic radius, such as in the case of a metal other than an alkali metal or alkaline-earth metal, since the covalent bond is stronger than the ionic bond, the nitrogen atom or sulfur atom is preferred.

The ligand used in the present invention is added in the polycondensation step and the timing of addition is not particularly limited. However, in order to inhibit the ligand from scattering, the ligand is preferably added after esterification and transesterification reactions or after polymerization, and in order to prevent the catalytic activity from being decreased by the ligand, the ligand is preferably added after the transesterification reaction or after polymerization.

When polyesters are produced, in general, (1) transesterification catalysts and polymerization catalysts and (2) compounds containing various metal elements to improve productivity by improving electrostatic characteristics are often added. Examples of (1) include iron, antimony, titanium, aluminum, germanium, manganese, cobalt, zinc, copper, nickel, cadmium, and tin. Examples of (2) include lithium, sodium, potassium, rubidium, cesium, beryllium, magnesium, calcium, strontium, and barium. Additionally, a large amount of a metal, such as magnesium, may be added to accelerate the productivity by decreasing the melt resistivity and increasing the casting rate.

However, the metals or metal ions described above also accelerate depolymerization reactions, such as decomposition, in addition to the acceleration of esterification reactions and polycondensation reactions. Therefore, in the present invention, by adding a predetermined ligand after the esterification reaction or polycondensation reaction, depolymerization can be inhibited. With respect to a ligand capable of coordinating to a metal or metal ion, the metal or metal ion is preferably at least one element selected from the group consisting of lithium, sodium, potassium, rubidium, cesium, beryllium, magnesium, calcium, strontium, barium, iron, antimony, titanium, aluminum, germanium, manganese, cobalt, zinc, copper, nickel, cadmium, and tin. The ligand of the present invention, as necessary, coordinates to these metals or metal ions, thus providing satisfactory performance.

When the ligand used in the present invention is added after the transesterification reaction, a ligand which does not impair the activity of the polycondensation catalyst metal must be used. As the polycondensation catalyst metal, antimony trioxide, antimony pentaoxide, antimony acetate, germanium dioxide, germanium tetraethoxide, tetrabutyl titanate, or the like having an ionic radius of 0.53 to 1.00 Å is often used. For example, when germanium dioxide is used as the polycondensation catalyst, the ionic diameter of the germanium ion is 1.74 Å, and since oxygen atoms, etc., coordinate to the germanium ion in the reaction system, the effective ionic radius is larger than that. Therefore, by using 12-crown-4 or 15-crown-5 having a hole size of 1.2 Å or 1.7 Å as the ligand, which is smaller than the germanium ion, the ligand can only enclose the transesterification catalyst without enclosing germanium dioxide which is the polymerization catalyst. Furthermore, as necessary, the transesterification catalyst can be separated and recovered from the polyester composition.

When the ligand used in the present invention is added after polycondensation, by using a ligand having a hole size close to the ionic radius of the polycondensation catalyst metal and the ionic radius of the transesterification catalyst, or by using a ligand which is known to be highly capable of trapping ions, the catalysts can be enclosed, and, as necessary, the catalysts can be recovered from the polyester composition. Additionally, in the present invention, when a metal for improving electrostatic attraction is added, preferably, the metal is enclosed in a clathrate compound beforehand so that only the ionic character is retained.

In the present invention, the amount of ligand added is preferably 0.001 to 10% by weight of the resultant polyester composition, and more preferably, 0.01 to 5% by weight. If the content of the ligand is out of the range of 0.001 to 10% by weight, sufficient activity-inhibiting effects and catalyst-eliminating effects may not be obtained. If the content of the ligand exceeds 10% by weight, the amount of ligand which is by itself subjected to pyrolysis, mechanical decomposition, and oxidative degradation may become significant, resulting in a decrease in heat resistance.

In the present invention, when a ligand including only oxygen as the donor atoms is used, because of the high affinity of the oxygen atom for alkali metals and alkaline-earth metals, with respect to an amount S [mol/ton-polymer] of the ligand relative to a total amount Ma [mol/ton-polymer] of alkali metals and alkaline-earth metals present in the polyester resin, the molar ratio $Rma=S/Ma$ is preferably in the range of 0.001 to 30, more preferably, 0.01 to 10, and most preferably, 0.1 to 5.

When a ligand including only nitrogen and sulfur as the donor atoms is used, because of the high affinity of the nitrogen and sulfur atoms for transition metals, with respect to the amount S [mol/ton-polymer] of the ligand relative to a total amount Mt [mol/ton-polymer] of transition metals present in the system, the molar ratio $Rmt=S/Mt$ is preferably in the range of 0.001 to 30, more preferably, 0.01 to 10, and most preferably, 0.1 to 5.

Furthermore, when a ligand including all of nitrogen, sulfur, and oxygen as the donor atoms is used, with respect to the amount S [mol/ton-polymer] of the ligand relative to a total amount Ms [mol/ton-polymer] of all the metals present in the system, the molar ratio $Rms=S/Ms$ is preferably in the range of 0.001 to 30, more preferably, 0.01 to 10, and most preferably, 0.1 to 5.

In the present invention, the melt resistivity of the polyester composition is preferably less than $15 \times 10^7$ Ω·cm, and more preferably, less than $10 \times 10^7$ Ω·cm. If the melt resistivity is $15 \times 10^7$ Ω·cm or more, electrostatic casting cannot be performed satisfactorily, and air can easily enter between the film and the casting drum during the melt extrusion casting. As a result, a decrease in the film-forming rate may be necessitated. Herein, the melt resistivity is defined as the value calculated by measuring the current flow when a voltage is applied to the polyester composition in the molten state, and is an index of electric conductivity.

In the present invention, the melt resistivity is preferably not increased by the presence of the ligand. If the melt resistivity is increased, electrostatic charging is degraded in the film-forming step, thus degrading the productivity of the film. Preferably, the relationship $R/R0 \leq 1.3$ is satisfied, more preferably, $R/R0 \leq 1.1$, and most preferably, $R/R0 \leq 1.0$, wherein R is a melt resistivity when the ligand is added, and R0 is a melt resistivity before the addition of the ligand.

In the present invention, preferably, the polyester composition includes ethylene terephthalate or ethylene-2,6-naphthalate as a principal constituent in view of heat resistance and mechanical characteristics.

In the polyester composition of the present invention, as copolymerizable components, a dicarboxylic acid or an ester-forming derivative thereof and a diol may be copolymerized to provide characteristics, such as heat resistance, high rigidity, and electrostatic properties.

Examples of dicarboxylic acid components copolymerizable in the polyester composition of the present invention are isophthalic acid, phthalic acid, 1,4-naphthalenedicarboxylic acid, 1,5-naphthalenedicarboxylic acid, 2,6-naphthalenedicarboxylic acid, 4-4'-diphenyldicarboxylic acid, 4-4'-diphenyletherdicarboxylic acid, and 4-4'-diphenylsulfonedicarboxylic acid, or ester-forming derivatives thereof.

Examples of diol components are aliphatic, alicyclic, and aromatic diols, such as ethylene glycol, 1,2-propanediol, neopentyl glycol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, diethylene glycol, triethylene glycol, polyalkylene glycols, and 2,2-bis(4'-β-hydroxyethoxyphenyl)propane. These components may be used alone or in combination.

Additionally, examples of the alicyclic dicarboxylic acid components copolymerizable in the polyester composition of the present invention include 1,4-cyclohexanedicarboxylic acid. Aliphatic dicarboxylic acids, such as sebacic acid and dimer acids, and other dicarboxylic acids may also be used as copolymerizable components.

In the esterification and transesterification reactions, various catalysts may be used. For example, acetates, such as calcium acetate, magnesium acetate, and lithium acetate, and titanium compounds, such as titanium tetraethylene glycoxide, may be used.

Examples of polymerization catalysts that can be used are antimony trioxide, antimony pentaoxide, germanium dioxide, germanium tetrabutoxide, germanium tetraethoxide, titanium tetraethylene glycoxide, and tetrabutyl titanate.

In the present invention, a stabilizer may be added in the polycondensation step in order to prevent side reactions, such as pyrolysis of the polyester. Examples of stabilizers that can be used are tetrakis{methylene-3-(dodecylthio) propionate}methane, tetrakis{methylene-(3,5-t-butyl-4-hydroxyhydrocinnamate)}methane, tridecylphosphate, tris(2,4-dibutylphenyl)phosphite, and tetrakis{methylene-3-(3',5'-di-t-butyl-4'-hydroxyphenyl)propionate)methane. These substances may be used alone or in combination. The amount of the stabilizer to be added is preferably 0.03 to 2% by weight of the resultant polyester composition, and more preferably, 0.05 to 1.9% by weight. If the amount of the stabilizer to be added is less than 0.03% by weight, the oxidation stability-improving effect may be decreased, or if the amount of the stabilizer exceeds 2% by weight, the polycondensation reaction may be hampered.

In the present invention, if a small amount of a basic compound is added in the esterification step, it is possible to obtain a polyester composition with a low content of side reaction products. Examples of such a basic compound are tertiary amines, such as triethylamine, tributylamine, and benzylmethylamine, and quaternary amines, such as tetraethylammonium hydroxide, tetrabutylammonium hydroxide, and trimethylbenzylammonium hydroxide.

The polyester composition of the present invention may be formed into a film by a melt extrusion method. That is, after the polyester composition is dried, the polyester composition is fed into a single-screw or twin-screw extruder provided with a T-die and is extruded on a casting drum at the melting temperature of the polyester, and electrostatic casting is performed to produce an unoriented film. In order to obtain an oriented polyester film, the unoriented film is further drawn by sequential biaxial orientation or simultaneous biaxial orientation, followed by heat treatment.

The polyester composition of the present invention alone may be formed into a film, or the polyester composition of the present invention may be mixed with another polyester composition to form a film. In some cases, in order to improve productivity and heat resistance, 1% by weight or more of the polyester composition of the present invention is preferably mixed with another polyester composition to form a film.

It is also possible to form a laminated film having a structure including a layer composed of the polyester composition of the present invention and a layer composed of another polyester composition so that the laminated film has combined characteristics of the individual layers. In order to produce the laminated film of the present invention, for example, after the polyester composition of the present invention and another polyester composition are dried, according to a commonly used method, a combined block including at least two rectangular lamination layers is melt-extruded from a die to form an unoriented sheet so that the individual layers are laminated at a predetermined thickness ratio and with a predetermined construction, and then biaxial drawing and heat treatment are preformed.

When the polyester composition of the present invention is subjected to biaxial drawing, although the draw ratio is not particularly limited, the draw ratio is usually 2 to 5 times in each of the longitudinal and transverse directions. Furthermore, after longitudinal drawing and transverse drawing are performed, redrawing may be performed either in the longitudinal direction or in the transverse direction, or simultaneous biaxial drawing may be performed. When an easy adhesion layer, a particle layer, etc., are formed, coating components may be applied in-line before drawing or between longitudinal drawing and transverse drawing. Alternatively, off-line coating may be performed after drawing.

In a method for producing a polyester composition according to the present invention, in the process of producing a polyester including an esterification step using an esterification catalyst and/or a polycondensation step using a polycondensation catalyst, the esterification catalyst and the polycondensation catalyst are separated and recovered by adding a ligand which is capable of coordinating to a metal or metal ion and which contains at least one donor atom selected from the group consisting of a nitrogen atom, a sulfur atom, and an oxygen atom.

In the method for producing the polyester composition of the present invention, for example, a dicarboxylic acid or an ester thereof and a glycol are used as raw materials.

In the present invention, in the esterification step and/or the polycondensation step, a distillate which is retrieved from the system is usually generated. The distillate contains 100 to 800 ppm, calculated on the basis of metal atomic weight, of catalysts, 4 to 20% by weight of water, 80 to 96% by weight of the glycol component, 0.3 to 5% by weight of the lower condensate (cyclic trimer) of the polyester, and 0.01 to 10% by weight of the ligand, in addition to stabilizers, iron, etc.

In the method for producing the polyester composition of the present invention, it is possible to recover the esterification catalyst and the polycondensation catalyst from the distillate which is retrieved from the system in the esterification step and/or the polycondensation step.

In the method for producing the polyester composition of the present invention, for example, after an aqueous solution having a higher affinity for cations compared to the ligand is added to the retrieved distillate to remove the metal from the ligand, a distillation step is performed to eliminate the water, low-boiling point components, the glycol, and the ligand, and simultaneously a residual catalyst is reacted with the glycol to produce a coordination compound including the glycol. By this step, a solution containing the water, the low-boiling point components, the glycol, and the ligand and a solid residue containing the catalyst are separated from each other. The solution containing the water, the low-boiling point components, the glycol, and the ligand is dissolved in an organic solvent, and purification is performed by the addition of activated carbon. The insoluble residue is filtered out, and water is added to the filtrate, followed by mixing. A precipitated solid is then separated by filtration, and cleaning is performed with water and ethanol, followed by drying to recover the ligand. The solid residue is further fractionated by a hot water dissolution step into a solid residue and a lower condensate, the stabilizer, and iron which are insoluble in water. Since substances other than the catalysts are insoluble in water, by filtering these substances out, followed by condensation, the catalysts can be recovered.

The catalysts thus recovered are retrieved as solids and can be used as additives in the esterification step and the polycondensation step in the same manner as the unused catalysts, and the quality of the polyester is not degraded.

On the other hand, in the metal or metal ion which is coordinated with the ligand described in the present invention, since the catalytic activity for decomposing the polyester is decreased, degradation in heat resistance by the metal or metal ion is decreased, thus improving the heat resistance of the polyester resin.

Moreover, with respect to the polyester composition of the present invention, electrostatic casting capability is not substantially degraded in the film-forming step. The reason for this is considered to be that the metal or metal ion which is coordinated to the ligand described in the present invention loses its catalytic activity while retaining its electric characteristics, or differing from the ionic bond, the ligand which is not strongly bonded to the metal ion is dissociated from the metal ion because of the high voltage during electrostatic charging, thus exhibiting its electric characteristics.

Inorganic particles or organic particles may be added to the polyester composition of the present invention as necessary. The inorganic particles to be added are not particularly limited, and compounds, such as silica, alumina, calcium carbonate, titanium oxides, calcium phosphates, hydroxyapatite, and aluminum silicate, may be used. Examples of the organic particles include crosslinked polymer particles.

In the method for producing the polyester composition of the present invention, by removing a portion of the metal contained in the polyester composition, the heat resistance of the polyester composition is improved, and colorability, weathering resistance, and productivity are also improved. In accordance with the method for producing the polyester composition of the present invention, polyester compositions suitable for various applications, such as for magnetic materials, packaging materials, optical materials, and electric materials, can be produced.

The polyester composition, the method for producing the polyester composition, and the film in accordance with the present invention have excellent heat resistance, colorability, and weathering resistance and are suitable for various applications, such as for magnetic materials, packaging materials, optical materials, and electric materials.

EXAMPLES

The present invention will be described in more detail based on the examples below. The individual properties in the examples were measured by the following methods.

(1) Measurement of Ligand Content (% by Weight)

After 100 mg of a composition sample was dissolved in 2 ml of hexafluoroisopropanol as a solvent, the mixture was left to stand for one night and dissolved in 1 ml of $CDCl_3$, and data obtained by a nuclear magnetic resonance method using a 400 MHz, $^1$H-NMR (Model GX-400 pulse FT spectrometer manufactured by JOEL) and a 22.5 MHz, $^{13}$C-NMR (Model FT-900 pulse FT spectrometer manufactured by JOEL) were analyzed to obtain the ligand content.

(2) Intrinsic Viscosity of Polymer ([η] (dL/g))

Measurement was conducted at 25° C. using o-chlorophenol as a solvent.

(3) Heat Resistance of Polymer (% BB) (Melt Heat Test)

A polymer in the quantity of 8 g was placed in a test tube, heat treatment was performed in a nitrogen atmosphere at a pressure of 0.1 MPa at 300° C., for 10 minutes ($t_0$), 3 hours (t), and 6 hours (t), and the respective values η were measured. Heat resistance was calculated according to the following equation:

$$\%BB_t = (1/[\eta]_t^{(1/0.75)} - 1/[\eta]_{t0}^{(1/0.75)})$$

wherein $[\eta]_t$ is a value when heat treatment was performed for 3 hours or 6 hours, and $[\eta]_{t0}$ is a value when heat treatment was performed for 10 minutes.

In the case of a film, the same method as that for the polymer described above was used apart from the fact that 8 g of the film was placed in a test tube and melted.

(4) Melt Resistivity

Electrodes were formed by placing a Teflon spacer between two copper plates, each with a size of 22 $cm^2$, the distance between the copper plates being 9 mm. The electrodes were immersed in a polymer melted at 290° C., and a resistance was calculated based on a current measured when a voltage of 5,000 V was applied between the electrodes.

(5) Metal Content (FLX)

A polymer in the quantity of 8 g was melted and molded into a plate, and the intensity of fluorescence X-rays was measured. The value measured was converted into the metal content using an analytical curve which was preliminarily prepared using samples with known contents.

(6) Metal Content (Atomic Absorption Spectrometry)

Alkali metals were measured by atomic absorption spectrometry. Using a hollow cathode lamp as a light source, 8 g of a polymer was atomized by flame atomization, and detection was performed by a photometric unit. The value measured was converted into the metal content using an analytical curve which was preliminarily prepared.

Example 1

Into a mixture of 100 parts by weight of dimethylterephthalate and 60 parts by weight of ethylene glycol, 0.04 parts by weight of magnesium acetate, relative to the amount of dimethylterephthalate, was added, and methanol was distilled off by heating to perform transesterification. The completion of transesterification was determined by the amount of the methanol distillate. Next, 0.020 parts by weight of trimethyl phosphate, relative to the amount of dimethylterephthalate, was added to the transesterification product, and 0.02 parts by weight of germanium oxide was then added thereto. The mixture was transferred to a polycondensation reaction vessel. Next, the pressure of the reaction system was gradually decreased while heating, and under reduced pressure, at 290° C., polymerization was performed while stirring the mixture and distilling methanol off. When the degree of polymerization reached the equivalent of an intrinsic viscosity of 0.62, the system was purged with nitrogen and the pressure was returned to the atmospheric pressure, and then, 0.06 parts by weight of potassium acetate and an ethylene glycol solution of 18-crown-6 (10 mol % relative to the metal content excluding the metal contained in particles) were thoroughly mixed and added thereto. The pressure of the reaction system was gradually decreased, and under reduced pressure, at 290° C., polymerization was performed again in the same manner as that described above. When the degree of polymerization reached the equivalent of an intrinsic viscosity of 0.62, discharge was performed at a predetermined torque, and a polyester composition (W) with an intrinsic viscosity of 0.60 was thereby obtained. The results thereof are shown in Table 1 below. As shown in Table 1, the measured 18-crown-6 content in the polyester composition was 8.3 mol %, and the amount (Rma) of ligand relative to the metals was 0.083.

Comparative Example 1

A polyethylene terephthalate (PL) chip with [η]=0.60 was obtained in the same manner as that of Example 1 apart from the fact that the equimolecular amount of ethylene glycol was added instead of 18-crown-6. The results thereof are shown in Table 1.

Reference Example 1

A polyester (S) chip containing particles with [η]=0.61 was obtained in the same manner as that of Comparative Example 1 apart from the fact that before the mixture was transferred to the polycondensation reaction vessel, an ethylene glycol slurry containing 5% by weight of silica particles having an average particle size of 0.05 μm was added in the quantity of 1% by weight as particles relative to the amount of dimethylterephthalate.

Example 2

A polyester composition was obtained in the same manner as that of Example 1 apart from the fact that the equimolecular amount of dibenzo-18-crown-6 was used instead of 18-crown-6. The results thereof are shown in Table 1.

Example 3

A polyester composition was obtained in the same manner as that of Example 1 apart from the fact that the equimolecular amount of dibenzo-30-crown-10 was used instead of 18-crown-6. The results thereof are shown in Table 1.

Example 4

A polyester composition was obtained in the same manner as that of Example 1 apart from the fact that the equimolecular amount of pentaglyme was used instead of 18-crown-6. The results thereof are shown in Table 1.

Example 5

A polyester composition was obtained in the same manner as that of Example 1 apart from the fact that the equimolecular amount of hexadecane glyme was used instead of 18-crown-6. The results thereof are shown in Table 1.

Comparative Example 2

A polyethylene terephthalate (K) chip with [η]=0.60 was obtained in the same manner as that of Example 1 apart from the fact that the equimolecular amount of ethylene glycol was added instead of each of potassium acetate and 18-crown-6. The results thereof are shown in Table 1.

TABLE 1

| | Ligand | Amount of ligand (mol %) (to Metal) *1 | Amount of ligand (to Metal) Rma | % BB 3 hours | % BB 6 hours | Number of donor atoms | Melt resistivity R (×10⁷ Ω·cm) | R/R0 |
|---|---|---|---|---|---|---|---|---|
| Example 1 | 18-crown-6 | 8.3 | 0.083 | 0.42 | 0.64 | 6 | 7 | 1 |
| Example 2 | Dibenzo-18-crown-6 | 7.7 | 0.077 | 0.45 | 0.67 | 6 | 7 | 1 |
| Example 3 | Dibenzo-30-crown-10 | 7.3 | 0.073 | 0.40 | 0.62 | 10 | 7 | 1 |
| Example 4 | Pentaglyme | 9.6 | 0.096 | 0.45 | 0.68 | 5 | 7 | 1 |
| Example 5 | Hexadecane glyme | 9.2 | 0.092 | 0.41 | 0.65 | 16 | 7 | 1 |
| Comparative Example 1 | No ligand | — | — | 0.49 | 0.76 | | 7 | 1 |
| Comparative Example 2 | No ligand | — | — | 0.48 | 0.65 | | 16 | 1 |

*1: Amount of ligand relative to total amount of alkali metals and alkaline-earth metals Example 6

A polyester composition was obtained in the same manner as that of Example 1 apart from the fact that 1.7% by weight of 18-crown-6 was added so that the amount added relative to the total amount of alkali and alkali-earth metals satisfied Rma=3.0. The results thereof are shown in Table 2.

Example 7

A polyester composition was obtained in the same manner as that of Example 1 apart from the fact that, instead of 18-crown-6, 0.08% by weight of hexaamine was added so that the amount added relative to the total amount of transition metals satisfied Rmt=3.0. The results thereof are shown in Table 2.

Example 8

A polyester composition was obtained in the same manner as that of Example 1 apart from the fact that, instead of 18-crown-6, 0.26% by weight of phosphorus sulfide was added so that the amount added relative to the total amount of transition metals satisfied Rmt=3.0. The results thereof are shown in Table 2.

Example 9

A polyester composition was obtained in the same manner as that of Example 1 apart from the fact that, instead of 18-crown-6, 1.12% by weight of [2,2,2] cryptand was added so that the amount added relative to the total amount of alkali and alkali-earth metals and transition metals satisfied Rms=3.0. The results thereof are shown in Table 2.

Comparative Example 3

A polyester composition was obtained in the same manner as that of Example 1 apart from the fact that, instead of 18-crown-6, 0.07% by weight of sodium bisulfate was added so that the amount added relative to the total amount of transition metals satisfied Rmt=3.0. The results thereof are shown in Table 2.

TABLE 2

|  | Ligand | Amount of ligand (to Metal) Rma, Rms, Rmt | % BB 3 hours | % BB 6 hours | Number of donor atoms | Melt resistivity R ($\times 10^7 \, \Omega \cdot cm$) | R/R0 |
|---|---|---|---|---|---|---|---|
| Example 6 | 18-crown-6 | Rma = 3.0 | 0.41 | 0.62 | 6 | 7 | 1 |
| Example 7 | Hexaamine | Rmt = 3.0 | 0.45 | 0.67 | 4 | 7 | 1 |
| Example 8 | Phosphorus sulfide | Rmt = 3.0 | 0.44 | 0.66 | 6 | 7 | 1 |
| Example 9 | [2,2,2]cryptand | Rms = 3.0 | 0.40 | 0.63 | 8 | 7 | 1 |
| Comparative Example 3 | No ligand | — | 0.42 | 0.64 | — | 20 | 2.86 |

Example 10

The polyester composition (W) obtained in Example 1 was thoroughly dried, fed into an extruder, and melt-extruded on a casting drum. Fusion bonding was performed while electrostatically charging the casting drum, and quench hardening was performed to produce a single-layer unoriented film. The unoriented film was then drawn, 3.5 times in the longitudinal direction at 90° C. and 3.5 times in the transverse direction at 105° C., and a polyester film with a thickness of 10 μm was thus obtained. Satisfactory film formability was exhibited. The film thus obtained had satisfactory heat resistance and productivity. The results thereof are shown in Table 3.

Example 11

A polyester film was obtained in the same manner as that of Example 10 apart from the fact that the polyester composition (W) obtained in Example 1, the polyethylene terephthalate (PL) obtained in Comparative Example 1, and the polyester (S) containing particles obtained in Reference Example 1 were thoroughly dried and dry blended so that the ligand content relative to the metal content (excluding the metal contained in particles) corresponded to the content (Rma=0.0021) shown in Table 3. The results thereof are shown in Table 3.

Example 12

The polyester composition (W) obtained in Example 1 and the polyethylene terephthalate (PL) obtained in Comparative Example 1 were thoroughly dried and dry blended so that the ligand content relative to the metal content (excluding the metal contained in particles) corresponded to the content (Rma=0.052) shown in Table 3. The mixture was fed into a primary layer (layer A) extruder. The polyester (S) containing particles obtained in Reference Example 1 was dried and dry blended with polyethylene terephthalate (PL) so that the particle content was 0.5% by weight. The mixture was fed into a secondary layer (layer B) extruder. Melt extrusion was performed through a two-layer die onto a casting drum, and fusion bonding was performed while electrostatically charging the casting drum, followed by quench hardening. An A/B type (thickness ratio 6/1) two-layer unoriented film was thus obtained. Next, the unoriented film was drawn at 90° C., 3.5 times in the longitudinal direction, and at 105° C., 3.5 times in the transverse direction, and a laminated polyester film with a thickness of 8 μm was thus obtained (thickness of layer B: 1.33 μm). Satisfactory film formability was exhibited. The film thus obtained had satisfactory heat resistance and productivity. The results thereof are shown in Table 3.

Example 13

A laminated polyester film was obtained in the same manner as that of Example 12 apart from the fact that the polyester composition (W) obtained in Example 1, the polyethylene terephthalate (PL) obtained in Comparative Example 1, and the polyester (S) containing particles obtained in Reference Example 1 were blended and fed into an extruder so that the ligand content relative to the metal content (excluding the metal contained in particles) in the layer A and the layer B corresponded to the content shown in Table 3 (layer A: Rma=0.015, layer B: Rma=0.000). The results thereof are shown in Table. 3.

Example 14

A laminated polyester film was obtained in the same manner as that of Example 12 apart from the fact that the polyester composition (W) obtained in Example 1, the polyethylene terephthalate (PL) obtained in Comparative Example 1, and the polyester (S) containing particles obtained in Reference Example 1 were blended and fed into an extruder so that the ligand content relative to the metal content (excluding the metal contained in particles) in the layer A and the layer B corresponded to the content shown in Table 3 (layer A: Rma=0.053, layer B: Rma=0.032). The results thereof are shown in Table 3.

Comparative Example 4

A film was formed in the same manner as that of Example 12 apart from the fact that the polyethylene terephthalate (PL) obtained in Comparative Example 1 was fed instead of the polyester composition (W) obtained in Example 1. Poor heat resistance was exhibited and productivity was degraded. The results thereof are shown in Table 3.

Comparative Example 5

A film was formed in the same manner as that of Example 10 apart from the fact that the polyethylene terephthalate (K) obtained in Comparative Example 2 was fed instead of the polyester composition (W) obtained in Example 1. Although heat resistivity was satisfactory, melt resistivity was increased and productivity was degraded. The results thereof are shown in Table 3.

Comparative Example 6

A laminated polyester film was obtained in the same manner as that of Example 12 apart from the fact that a polyethylene terephthalate chip with [η]=0.60 was produced in the same manner as that of Example 1 except that diethylene glycol was used instead of 18-crown-6, and the polyethylene terephthalate (PL) obtained in Comparative Example 1 and the polyester (S) containing particles obtained in Reference Example 1 were blended and fed into an extruder. The results thereof are shown in Table 3.

of trimethyl phosphate, relative to the amount of dimethylterephthalate, was added to the transesterification product, and 0.007% by weight of germanium dioxide was then added thereto. The mixture was transferred to a polycondensation reaction vessel. Next, the pressure of the reaction system was gradually decreased while heating, and under a reduced pressure of 133 Pa, at 290° C., polymerization was performed while stirring and distilling methanol off. When the degree of polymerization reached the equivalent of an intrinsic viscosity of 0.62, the system was purged with nitrogen and the pressure was returned to the atmospheric pressure. Next, 0.03% by weight of potassium acetate and 0.2% by weight of an ethylene glycol solution of 18-crown-6 were thoroughly mixed and added thereto. The pressure of the reaction system was gradually decreased, and under a reduced pressure of 133 Pa, at 290° C., polymerization was performed again in the same manner as that described above. When the degree of polymerization reached the equivalent of an intrinsic viscosity of 0.62, discharge was performed at a predetermined torque, and a polyester composition with an intrinsic viscosity of 0.60 was thereby obtained. The results thereof are shown in Table 4 below. In Table 4, the amount of metal added means the amount of metal added before repolymerization, and the metal content means the amount of metal in the resultant polyester composition. The difference between the amount of metal added and the metal content corresponds to the amount of metal removed.

TABLE 3

| | | Lamination structure | | | | | | |
|---|---|---|---|---|---|---|---|---|
| | | Layer A | | Layer B | | | | |
| | Ligand | Amount of ligand (mol %) (to Metal) *1 | Amount of ligand (to Metal) Rma | Amount of ligand (mol %) (to Metal) *1 | Amount of ligand (to Metal) Rma | % BB 3 hrs  6 hrs | Number of donor atoms | Melt resistivity R ($\times 10^7$ Ω·cm)  R/R0 |
| Example 10 | 18-crown-6 | 8.3 | Rma = 0.083 | — | | 0.50  0.68 | 6 | 7  1 |
| Example 11 | 18-crown-6 | 2.1 | Rma = 0.021 | — | | 0.55  0.77 | 6 | 7  1 |
| Example 12 | 18-crown-6 | 5.2 | Rma = 0.052 | 0.0 | Rma = 0.000 | 0.52  0.74 | 6 | 7  1 |
| Example 13 | 18-crown-6 | 1.5 | Rma = 0.015 | 0.0 | Rma = 0.000 | 0.55  0.78 | 6 | 7  1 |
| Example 14 | 18-crown-6 | 5.3 | Rma = 0.053 | 3.2 | Rma = 0.032 | 0.51  0.75 | 6 | 7  1 |
| Comparative Example 4 | No ligand | — | | — | | 0.59  0.86 | — | 7  1 |
| Comparative Example 5 | No ligand | — | | — | | 0.50  0.74 | — | 16  1 |
| Comparative Example 6 | No ligand | — | | — | | 0.63  0.85 | — | 7  1 |

*1: Amount of ligand relative to total amount of alkali metals and alkaline-earth metals

Example 15

Into a mixture of 100 parts by weight of dimethylterephthalate and 60 parts by weight of ethylene glycol, 0.04% by weight of magnesium acetate, relative to the amount of dimethylterephthalate, was added, and methanol was distilled off by heating to perform transesterification. The completion of transesterification was determined by the amount of the methanol distillate. Next, 0.020% by weight Metal ions and ligands were separated and recovered from the distillate, which was retrieved from the system in the polycondensation step, by a method described below. After $HNO_3$ was added to the distillate so as to satisfy pH=1.5, water, low-boiling point components, and ethylene glycol were removed by distillation at 210° C. at 1,330 Pa for 4 hours, and a solid residue was separated. Into the low-boiling point components, 400 parts by weight of ethanol, 30 parts by weight of potassium acetate, and 10 parts by weight of activated carbon were added, followed by mixing at room temperature. Impurities generated were filtered out, and 1,000 parts by weight of water were added to the filtrate. A precipitated solid was then separated by filtration, and cleaning was performed with water and ethanol, followed by drying. A white powder (18-crown-6) was thereby obtained. To the solid residue, 100 parts by weight of purified water was added, and the solid residue was dissolved by heating at 95° C. at atmospheric pressure for 2 hours. Insoluble components were filtered out at 50° C. using a membrane filter (5.0 μm). The filtrate contained 500 ppm, calculated on the basis of germanium atomic weight, of the germanium catalyst, 50 ppm of the magnesium catalyst, and 3,000 ppm of the potassium catalyst. The resultant filtrate was condensed at 95° C. at 55,000 Pa for 2 hours and an aqueous solution containing 1.5% by weight of germanium, 9% by weight of potassium, and 0.15% by weight of magnesium was formed. Acetic acid and ethylene glycol (EG) were added thereto and azeotropic distillation was performed to form an EG solution (mixed catalyst) containing 4.5% by weight of germanium, 18% by weight of potassium, and 0.45% by weight of magnesium.

Example 16

Into a mixture of 100 parts by weight of dimethylterephthalate and 60 parts by weight of ethylene glycol, 0.038% by weight of magnesium acetate, relative to the amount of dimethylterephthalate, was added, and methanol was distilled off by heating to perform transesterification. The completion of transesterification was determined by the amount of the methanol distillate. Next, 0.020% by weight of trimethyl phosphate, relative to the amount of dimethylterephthalate, was added to the transesterification product. The mixed catalyst recovered in Example 15 was added thereto so that the amount of potassium acetate was 0.03% by weight, and 0.0042% by weight of germanium dioxide was further added thereto. The mixture was transferred to a polycondensation reaction vessel. Next, the pressure of the reaction system was gradually decreased while heating, and under reduced pressure, at 290° C., polymerization was performed while stirring and distilling methanol off. When the degree of polymerization reached the equivalent of an intrinsic viscosity of 0.62, the system was purged with nitrogen and the pressure was returned to the atmospheric pressure. An ethylene glycol solution of the 18-crown-6 recovered in Example 1 was prepared and thoroughly mixed, and 0.2% by weight thereof was added to the reaction system. The pressure of the reaction system was gradually decreased, and under reduced pressure, at 290° C., polymerization was performed again in the same manner as that described above. When the degree of polymerization reached the equivalent of an intrinsic viscosity of 0.62, discharge was performed at a predetermined torque, and a polyester composition with an intrinsic viscosity of 0.60 was thereby obtained. The results thereof are shown in Table 4. In Table 4, the amount of metal added means the amount of metal added before repolymerization, and the metal content means the amount of metal in the resultant polyester composition. The difference between the amount of metal added and the metal content corresponds to the amount of metal removed.

Example 17

Into a mixture of 100 parts by weight of dimethylterephthalate and 60 parts by weight of ethylene glycol, 0.04% by weight of magnesium acetate, relative to the amount of dimethylterephthalate, was added, and methanol was distilled off by heating to perform transesterification. The completion of transesterification was determined by the amount of the methanol distillate. Next, 0.020% by weight of trimethyl phosphate, relative to the amount of dimethylterephthalate, was added to the transesterification product, and then 0.007% by weight of antimony trioxide was added thereto. The mixture was transferred to a polycondensation reaction vessel. Next, the pressure of the reaction system was gradually decreased while heating, and under reduced pressure, at 290° C., polymerization was performed while stirring and distilling methanol off. When the degree of polymerization reached the equivalent of an intrinsic viscosity of 0.62, the system was purged with nitrogen and the pressure was returned to the atmospheric pressure. Potassium acetate in the amount of 0.03% by weight and an ethylene glycol solution of dibenzo-18-crown-6 in the amount of 0.2% by weight were thoroughly mixed and added to the system. The pressure of the reaction system was gradually decreased, and under reduced pressure, at 290° C., polymerization was performed again in the same manner as that described above. When the degree of polymerization reached the equivalent of an intrinsic viscosity of 0.62, discharge was performed at a predetermined torque, and a polyester composition with an intrinsic viscosity of 0.60 was thereby obtained. The results thereof are shown in Table 4. In Table 4, the amount of metal added means the amount of metal added before repolymerization, and the metal content means the amount of metal in the resultant polyester composition. The difference between the amount of metal added and the metal content corresponds to the amount of metal removed.

Example 18

A polyester composition was obtained in the same manner as that of Example 15 apart from the fact that, instead of 18-crown-6, the equivalent weight percent of dibenzo-30-crown-10 was added. The results thereof are shown in Table 4. In Table 4, the amount of metal added means the amount of metal added before repolymerization, and the metal content means the amount of metal in the resultant polyester composition. The difference between the amount of metal added and the metal content corresponds to the amount of metal removed.

Example 19

Into a mixture of 100 parts by weight of dimethylterephthalate and 60 parts by weight of ethylene glycol, 0.04% by weight of magnesium acetate, relative to the amount of dimethylterephthalate, was added, and methanol was distilled off by heating to perform transesterification. The completion of transesterification was determined by the amount of the methanol distillate. Next, 0.020% by weight of trimethyl phosphate, relative to the amount of dimethylterephthalate, was added to the transesterification product, and 0.007% by weight of germanium dioxide was then added thereto. The mixture was transferred to a polycondensation reaction vessel. Next, the pressure of the reaction system was gradually decreased while heating, and under reduced pressure, at 290° C., polymerization was performed while stirring and distilling methanol off. When the degree of polymerization reached the equivalent of an intrinsic viscosity of 0.62, the system was purged with nitrogen and the pressure was returned to the atmospheric pressure. Next, an ethylene glycol solution of 12-crown-4 was thoroughly mixed and 0.2% by weight thereof was added to the reaction system. The pressure of the reaction system was gradually decreased, and under reduced pressure, at 290° C., polymerization was performed again in the same manner as that described above. When the degree of polymerization reached the equivalent of an intrinsic viscosity of 0.62, discharge was performed at a predetermined torque, and a polyester composition with an intrinsic viscosity of 0.60 was thereby obtained. The results thereof are shown in Table 4. In Table 4, the amount of metal added means the amount of metal added before repolymerization, and the metal content means the amount of metal in the resultant polyester composition. The difference between the amount of metal added and the metal content corresponds to the amount of metal removed.

Example 20

A polyester composition was obtained in the same manner as that of Example 15 apart from the fact that, instead of 18-crown-6, the equivalent weight percent of 15-crown-5 was added. The results thereof are shown in Table 4. In Table 4, the amount of metal added means the amount of metal added before repolymerization, and the metal content means the amount of metal in the resultant polyester composition. The difference between the amount of metal added and the metal content corresponds to the amount of metal removed.

Example 21

Into a mixture of 100 parts by weight of dimethylterephthalate and 60 parts by weight of ethylene glycol, 0.04% by weight of magnesium acetate, relative to the amount of dimethylterephthalate, was added, and methanol was distilled off by heating to perform transesterification. The completion of transesterification was determined by the amount of the methanol distillate. Next, 0.020% by weight of trimethyl phosphate, relative to the amount of dimethylterephthalate, was added to the transesterification product, and 0.007% by weight of germanium dioxide was then added thereto. The mixture was transferred to a polycondensation reaction vessel. Next, the pressure of the reaction system was gradually decreased while heating, and under a reduced pressure of 133 Pa, at 290° C., polymerization was performed while stirring and distilling ethylene glycol off. When the degree of polymerization reached the equivalent of an intrinsic viscosity of 0.62, the system was purged with nitrogen and the pressure was returned to the atmospheric pressure. Next, 0.003% by weight of potassium acetate and an ethylene glycol solution of hexamine in a predetermined amount were thoroughly mixed and added to the reaction system. The pressure of the reaction system was gradually decreased, and under a reduced pressure of 133 Pa, at 290° C., polymerization was performed again in the same manner as that described above. When the degree of polymerization reached the equivalent of an intrinsic viscosity of 0.62, a polymer was discharged, and a polyester composition with an intrinsic viscosity of 0.60 was thereby obtained. The results thereof are shown in Table 4. In Table 4, the amount of metal added means the amount of metal added before repolymerization, and the metal content means the amount of metal in the resultant polyester composition. The difference between the amount of metal added and the metal content corresponds to the amount of metal removed. By using nitrogen as donor atoms, the germanium ion content was significantly decreased, germanium being a transition metal.

Metal ions and ligands were separated and recovered from the distillate, which was retrieved from the system in the polycondensation step, by a method described below After $HNO_3$ was added to the distillate so as to satisfy pH=1.5, water, low-boiling point components, and ethylene glycol were removed by distillation at 210° C. at 1,330 Pa for 4 hours, and a solid residue was separated. Into the low-boiling point components, 400 parts by weight of ethanol, 3 parts by weight of potassium acetate, and 10 parts by weight of activated carbon were added, followed by mixing at room temperature. Impurities generated were filtered out, and 1,000 parts by weight of water were added to the filtrate. A precipitated solid was then separated by filtration, and cleaning was performed with water and ethanol, followed by drying. A white powder (hexaamine) was thereby obtained. To the solid residue, 100 parts by weight of purified water was added, and the solid residue was dissolved by heating at 95° C. at atmospheric pressure for 2 hours. Insoluble components were filtered out at 50° C. using a membrane filter (5.0 μm). The filtrate contained 500 ppm, calculated on the basis of germanium atomic weight, of the germanium catalyst, 50 ppm of the magnesium catalyst, and 300 ppm of the potassium catalyst. The resultant filtrate was condensed at 95° C. at 55,000 Pa for 2 hours and an aqueous solution containing 1.5% by weight of germanium, 0.9% by weight of potassium, and 0.15% by weight of magnesium was formed. Acetic acid and ethylene glycol (EG) were added thereto and azeotropic distillation was performed to form an EG solution (mixed catalyst) containing 4.5% by weight of germanium, 1.8% by weight of potassium, and 0.45% by weight of magnesium.

Example 22

Into a mixture of 100 parts by weight of dimethylterephthalate and 60 parts by weight of ethylene glycol, 0.038% by weight of magnesium acetate, relative to the amount of dimethylterephthalate, was added, and methanol was distilled off by heating to perform transesterification. The completion of transesterification was determined by the amount of the methanol distillate. Next, 0.020% by weight of trimethyl phosphate, relative to the amount of dimethylterephthalate, was added to the transesterification product. The mixed catalyst recovered in Example 21 was added thereto so that the amount of potassium acetate was 0.003% by weight, and 0.0042% by weight of germanium dioxide was further added thereto. The mixture was transferred to a polycondensation reaction vessel. Next, the pressure of the reaction system was gradually decreased while heating, and under a reduced pressure of 133 Pa, at 290° C., polymerization was performed while stirring and distilling ethylene glycol off. When the degree of polymerization reached the equivalent of an intrinsic viscosity of 0.62, the system was purged with nitrogen and the pressure was returned to the atmospheric pressure. An ethylene glycol solution of the hexaamine recovered in Example 21 was prepared and thoroughly mixed and a predetermined amount thereof was added to the reaction system. The pressure of the reaction system was gradually decreased, and under a reduced pressure of 133 Pa, at 290° C., polymerization was performed again in the same manner as that described above. When the degree of polymerization reached the equivalent of an intrinsic viscosity of 0.62, a polymer was discharged, and a polyester composition with an intrinsic viscosity of 0.60 was thereby obtained. The results thereof are shown in Table 4. In Table 4, the amount of metal added means the amount of metal added before repolymerization, and the metal content means the amount of metal in the resultant polyester composition. The difference between the amount of metal added and the metal content corresponds to the amount of metal removed.

Example 23

Into a mixture of 100 parts by weight of dimethylterephthalate and 60 parts by weight of ethylene glycol, 0.04% by weight of magnesium acetate, relative to the amount of dimethylterephthalate, was added, and methanol was distilled off by heating to perform transesterification. The completion of transesterification was determined by the amount of the methanol distillate. Next, 0.020% by weight of trimethyl phosphate, relative to the amount of dimethylterephthalate, was added to the transesterification product, and then 0.007% by weight of antimony trioxide was added thereto. The mixture was transferred to a polycondensation reaction vessel. Next, the pressure of the reaction system was gradually decreased while heating, and under a reduced pressure of 133 Pa, at 290° C., polymerization was performed while stirring and distilling ethylene glycol off. When the degree of polymerization reached the equivalent of an intrinsic viscosity of 0.62, the system was purged with nitrogen and the pressure was returned to the atmospheric pressure. Potassium acetate in the amount of 0.03% by weight and an ethylene glycol solution of hexaamine in a predetermined amount were thoroughly mixed and added to the reaction system. The pressure of the reaction system was gradually decreased, and under a reduced pressure of 133 Pa, at 290° C., polymerization was performed again in the same manner as that described above. When the degree of polymerization reached the equivalent of an intrinsic viscosity of 0.62, a polymer was discharged, and a polyester composition with an intrinsic viscosity of 0.60 was thereby obtained. The results thereof are shown in Table 4. In Table 4, the amount of metal added means the amount of metal added before repolymerization, and the metal content means the amount of metal in the resultant polyester composition. The difference between the amount of metal added and the metal content corresponds to the amount of metal removed.

Example 24

A polyester composition was obtained in the same manner as that of Example 15 apart from the fact that the amount of 18-crown-6 added was 0.025% by weight and a predetermined amount of hexaamine was added. The results thereof are shown in Table 4.

Comparative Example 7

A polyester composition was obtained in the same manner as that of Example 15 apart from the fact that 18-crown-6 was not added. The results thereof are shown in Table 4. In Table 4, the amount of metal added means the amount of metal added before repolymerization, and the metal content means the amount of metal in the resultant polyester composition.

TABLE 4

| | Ligand | Ligand content wt % (to polyester) | Amount of ligand (to Metal) Rma, Rmt | % BB 3 hrs | % BB 6 hrs | Number of donor atoms | Amount added (ppm) Ge | Amount added (ppm) Sb | Amount added (ppm) Mg | Amount added (ppm) K | Content (ppm) Ge | Content (ppm) Sb | Content (ppm) Mg | Content (ppm) K |
|---|---|---|---|---|---|---|---|---|---|---|---|---|---|---|
| Example 15 | 18-crown-6 | 0.2 | Rma = 1.5 | 0.38 | 0.58 | 6 | 50 | | 45 | 120 | 35 | | 30 | 60 |
| Example 16 | 18-crown-6 | 0.2 | Rma = 1.5 | 0.38 | 0.59 | 6 | 50 | | 45 | 120 | 40 | | 35 | 70 |
| Example 17 | Dibenzo18-crown-6 | 0.2 | Rma = 1.1 | 0.39 | 0.61 | 6 | | 60 | 45 | 120 | | 50 | 30 | 80 |
| Example 18 | Dibenzo30-crown-10 | 0.2 | Rma = 0.75 | 0.38 | 0.65 | 10 | 50 | | 45 | 120 | 40 | | 25 | 40 |
| Example 19 | 12-crown-4 | 0.2 | Rma = 6.0 | 0.31 | 0.51 | 4 | 50 | | 45 | | 35 | | 35 | |
| Example 20 | 15-crown-5 | 0.2 | Rma = 1.8 | 0.41 | 0.64 | 5 | 50 | | 45 | 120 | 35 | | 35 | 100 |
| Example 21 | Hexaamine | 0.05 | Rmt = 5 | 0.34 | 0.53 | 4 | 50 | | 45 | 12 | 20 | | 40 | 11 |
| Example 22 | Hexaamine | 0.05 | Rmt = 5 | 0.34 | 0.54 | 4 | 50 | | 45 | 12 | 25 | | 40 | 11 |
| Example 23 | Hexaamine | 0.034 | Rmt = 5 | 0.33 | 0.53 | 4 | | 60 | 45 | 12 | | 40 | 40 | 11 |
| Example 24 | Hexaamine 18-crown-6 | 0.025 0.16 | Rmt = 2.5 Rma = 2.5 | 0.38 | 0.57 | 4 6 | 50 | | 45 | 120 | 25 | | 30 | 80 |
| Comparative Example 7 | — | 0.0 | 0 | 0.44 | 0.71 | 0 | | 60 | 45 | 120 | | 60 | 40 | 100 |

INDUSTRIAL APPLICABILITY

The polyester composition and film of the present invention are suitable for various applications, such as for magnetic materials, packaging materials, optical materials, and electric materials because of excellent heat resistance, colorability, and weathering resistance.

In accordance with a method for producing a polyester composition of the present invention, it is possible to remove metal catalysts, which adversely affect heat resistance, without decreasing electrostatic adhesion between a molten film and a casting drum. Consequently, it is possible to produce polyester compositions at high productivity. Moreover, in accordance with the method for producing the polyester composition of the present invention, it is possible to recover catalysts, and thus production costs can be reduced.

The invention claimed is:

1. A polyester composition comprising a polyester and a ligand coordinated to a metal ion, wherein the ligand is a clathrate compound and comprises at least one donor atom selected from the group consisting of a nitrogen atom, a sulfur atom, and an oxygen atom, the polyester composition having a melt resistivity of less than $15 \times 10^7$ Ω·cm.

2. A polyester composition according to claim 1, wherein the ligand is at least one compound selected from the group consisting of linear polyether amides, cyclic polyethers, linear polyethers, cyclic polyether polyesters, cyclic polyketones, cyclic polyamines, cyclic polyamine polyamides, cyclic polythiaethers, azacrown ethers, thiacrown ethers, cyclic azathiacrown ethers, azathiacrown ethers, bicyclic cryptands, tricyclic cryptands, spherical cryptands, linear polyamines, and phosphorus sulfide.

3. A polyester composition according to claim 1, wherein the number of donor atoms contained in the ligand is 4 to 20.

4. A polyester composition according to claim 1, wherein the metal or metal ion is at least one element selected from the group consisting of lithium, sodium, potassium, rubidium, cesium, beryllium, magnesium, calcium, strontium, barium, iron, antimony, titanium, aluminum, germanium, manganese, cobalt, zinc, copper, nickel, cadmium, and tin.

5. A polyester composition according to claim 1, wherein a melt resistivity R0 before the addition of the ligand and a melt resistivity R after the addition of the ligand satisfy the relationship $R/R0 \leq 1.3$.

6. A polyester composition according to claim 1, the polyester composition comprises polyethylene terephthalate or polyethylene-2,6-naphthalate.

7. A film comprising a polyester composition according to claim 1.

8. A laminated film comprising at least one layer of the film according to claim 7.

* * * * *